United States Patent [19]

Page, Jr.

[11] 4,354,395
[45] Oct. 19, 1982

[54] SHOCK ABSORPTION APPARATUS ASSOCIATED WITH WELL PUMP

[76] Inventor: John S. Page, Jr., 21372 Brookhurst St., #312, Huntington Beach, Calif. 92646

[21] Appl. No.: 216,321

[22] Filed: Dec. 15, 1980

[51] Int. Cl.³ .................. F16H 21/32; E21B 43/00
[52] U.S. Cl. ........................... 74/41; 74/581; 74/583
[58] Field of Search ............ 74/41, 108, 581, 582, 74/583; 267/64.27

[56] References Cited

U.S. PATENT DOCUMENTS

| | | | |
|---|---|---|---|
| 264,860 | 9/1882 | Butterfield | 74/583 |
| 595,914 | 12/1897 | Karns . | |
| 689,147 | 12/1901 | Vogt | 74/41 |
| 1,214,325 | 1/1917 | Kuss | 74/582 |
| 1,335,361 | 3/1920 | Bodine et al. | 74/581 |
| 1,649,078 | 11/1927 | Ratigan | 74/582 |
| 1,656,046 | 1/1928 | Coleston | 74/108 |
| 2,067,700 | 1/1937 | Hunt et al. | 74/582 |
| 2,125,861 | 8/1938 | Deckard | 74/582 |
| 2,237,303 | 4/1941 | Calhoun | 74/583 |
| 2,711,312 | 6/1955 | Ratigan | 267/153 |
| 2,878,012 | 3/1959 | Crites | 267/122 |
| 2,925,266 | 2/1960 | McAllister | 74/582 |
| 3,055,228 | 9/1962 | McStravick | 74/41 |
| 3,160,111 | 12/1964 | Berry | 74/581 |
| 3,227,470 | 1/1966 | Funk | 267/64.27 |
| 3,288,455 | 11/1966 | Robinson | 267/137 |
| 3,363,475 | 1/1968 | Foster et al. | 74/581 |
| 3,427,887 | 2/1969 | Jones | 74/41 |
| 3,819,206 | 6/1974 | Aaron et al. | 267/153 |
| 4,176,714 | 12/1979 | Case | 166/75 R |

FOREIGN PATENT DOCUMENTS 204834 12/1908 Fed. Rep. of Germany ........ 74/581

*Primary Examiner*—Lawrence J. Staab
*Attorney, Agent, or Firm*—William W. Haefliger

[57] ABSTRACT

A well sucker rod shock absorber apparatus employs cushion means located transversely of the rod string. Cushion means may also be located in association with the drive for the pumping unit that reciprocates the rod string.

20 Claims, 14 Drawing Figures

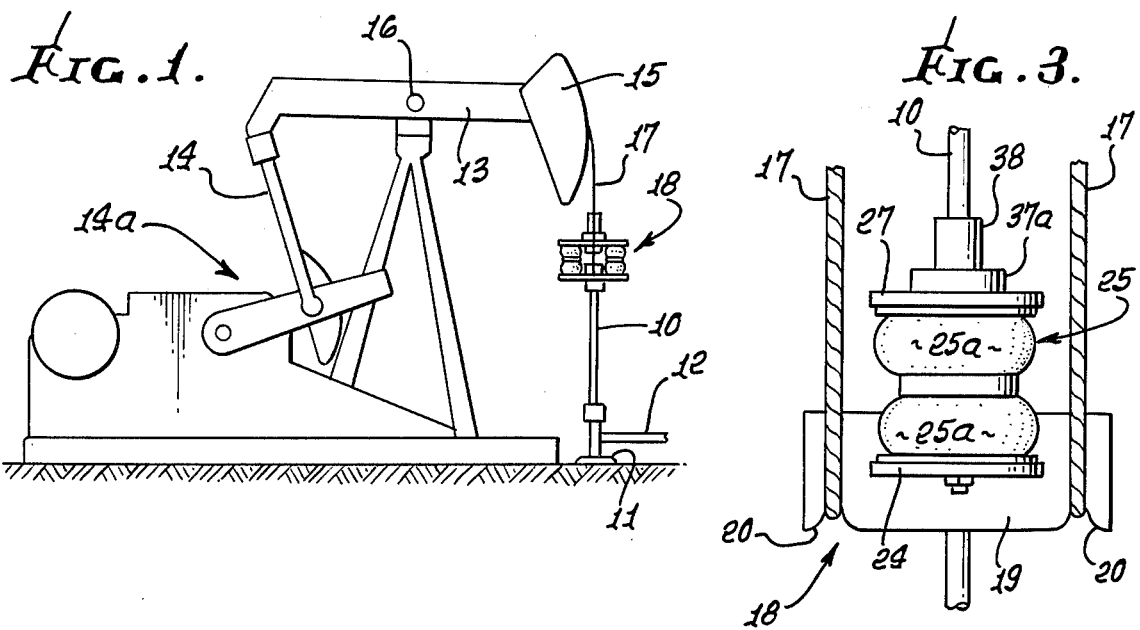
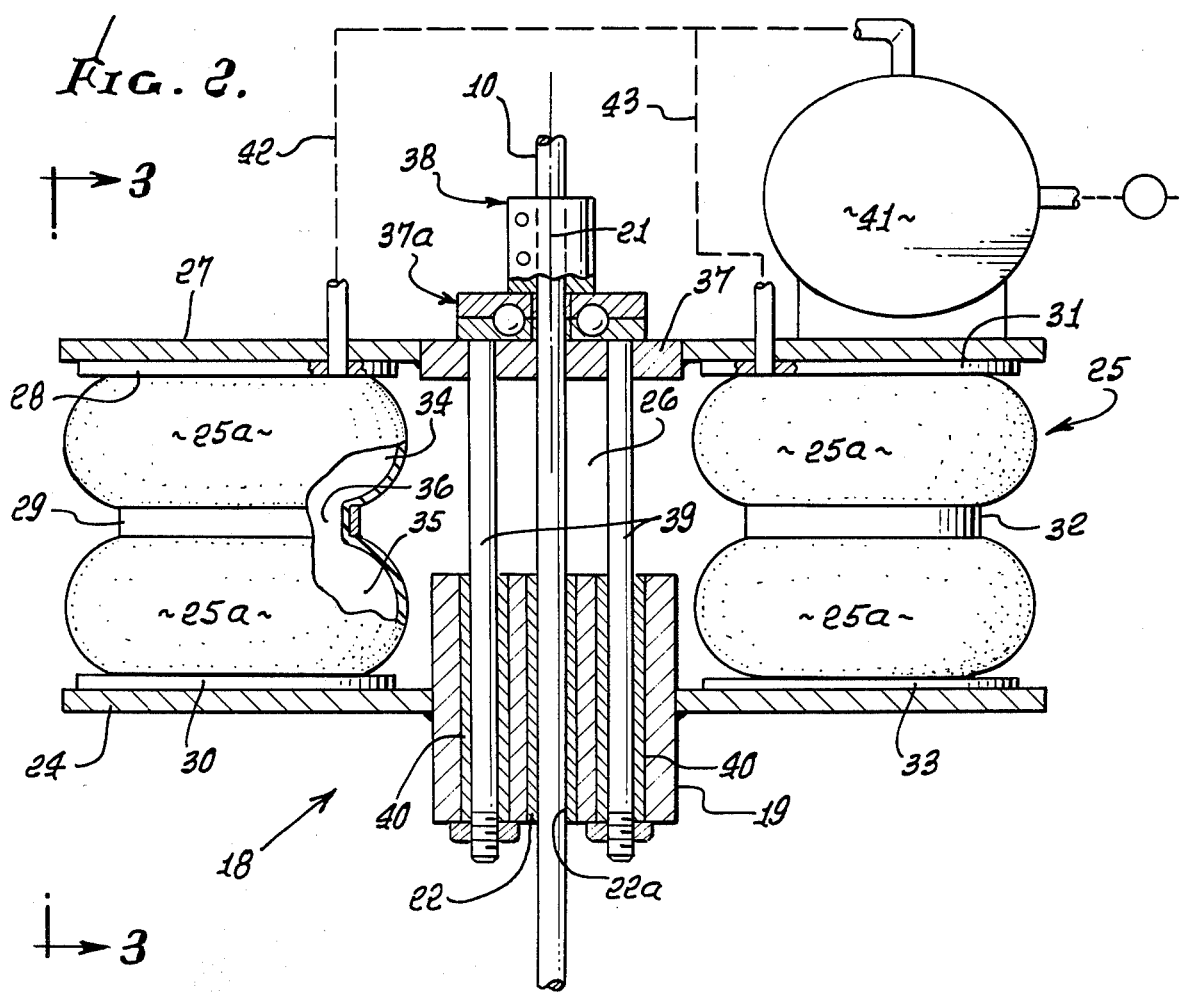

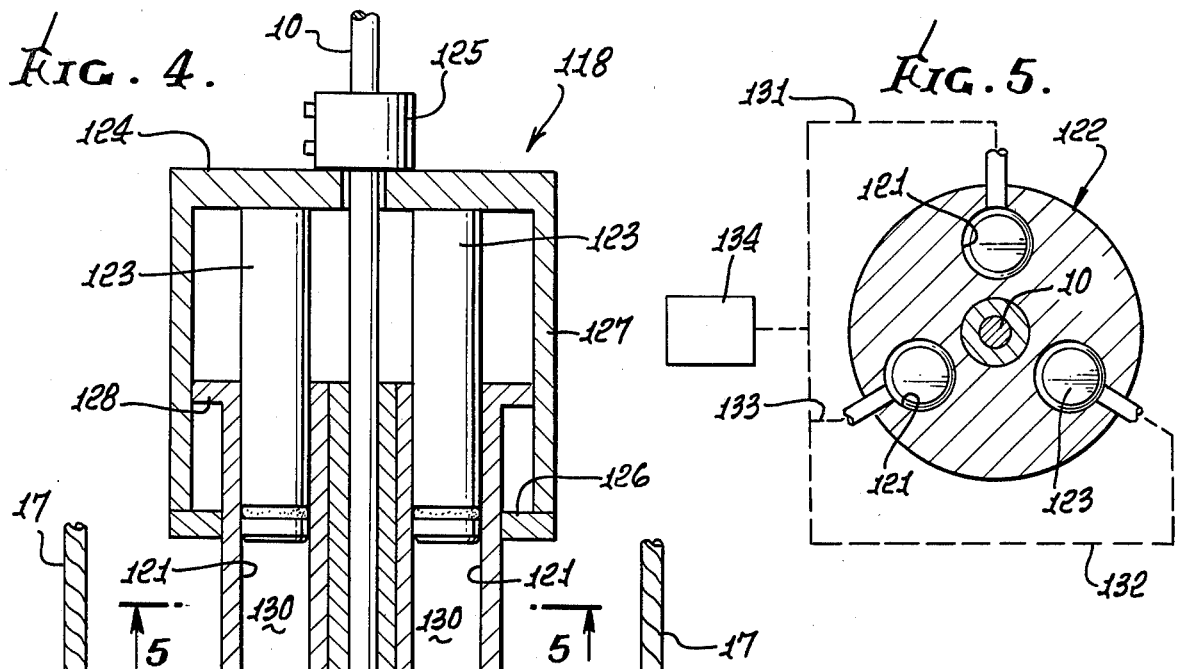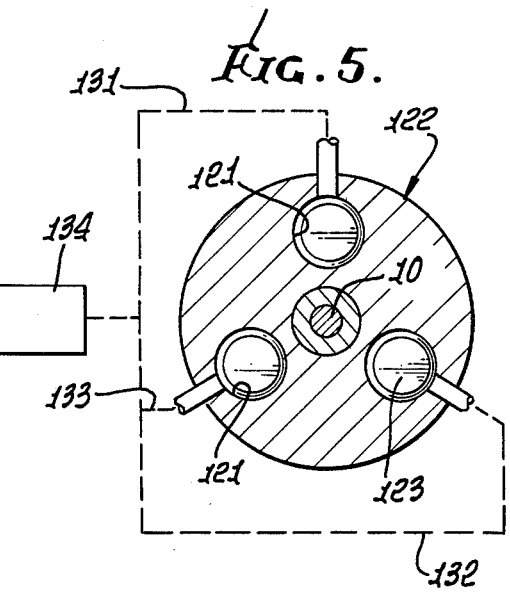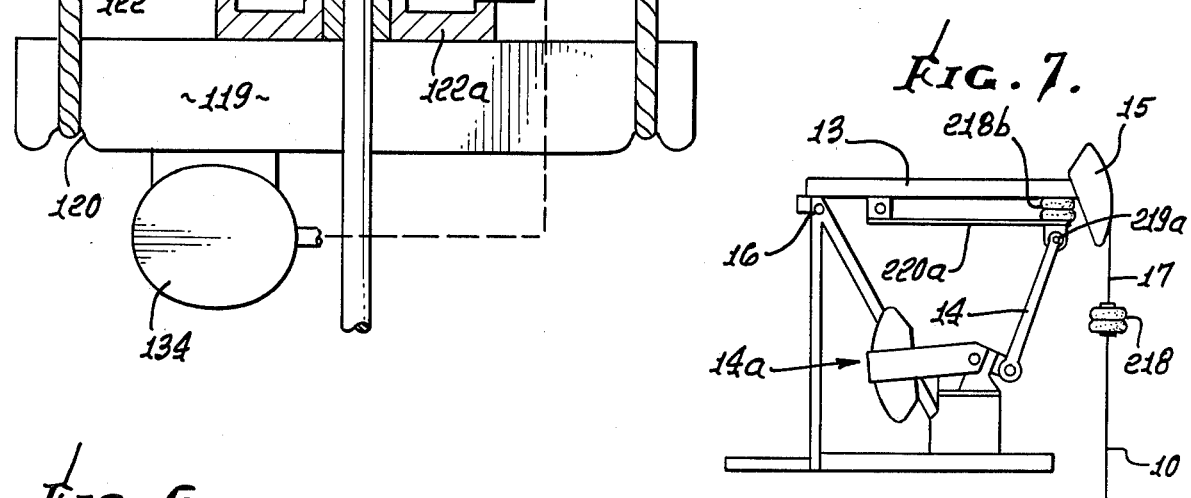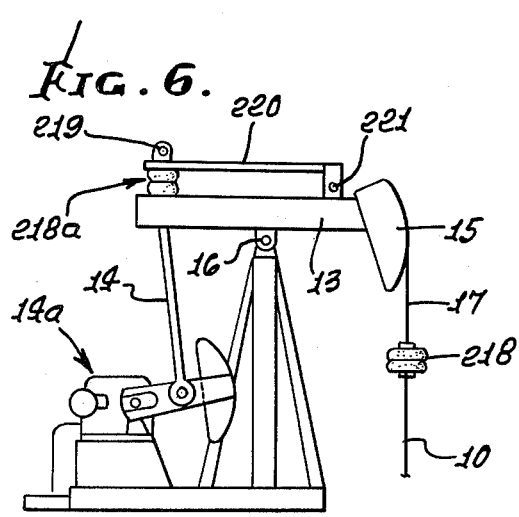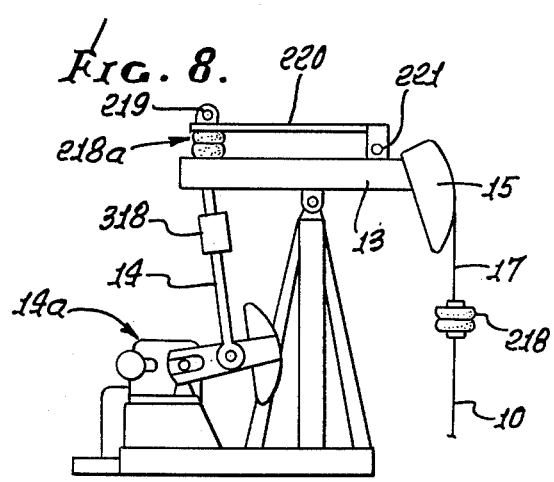

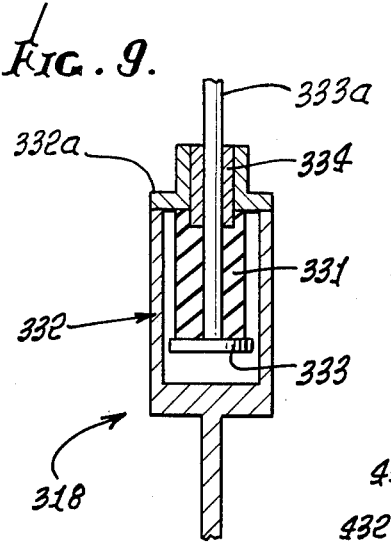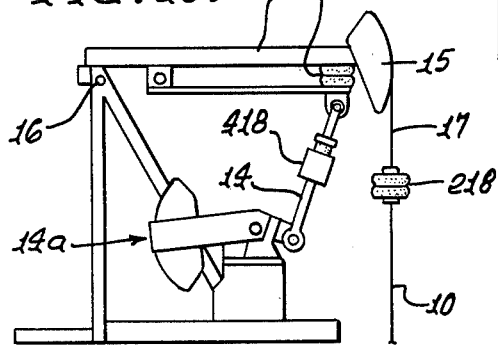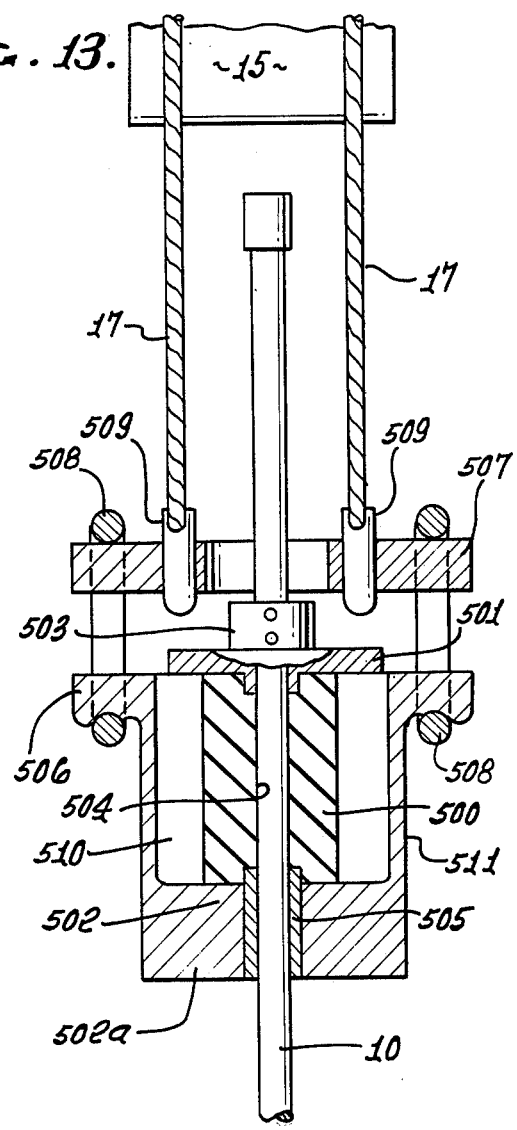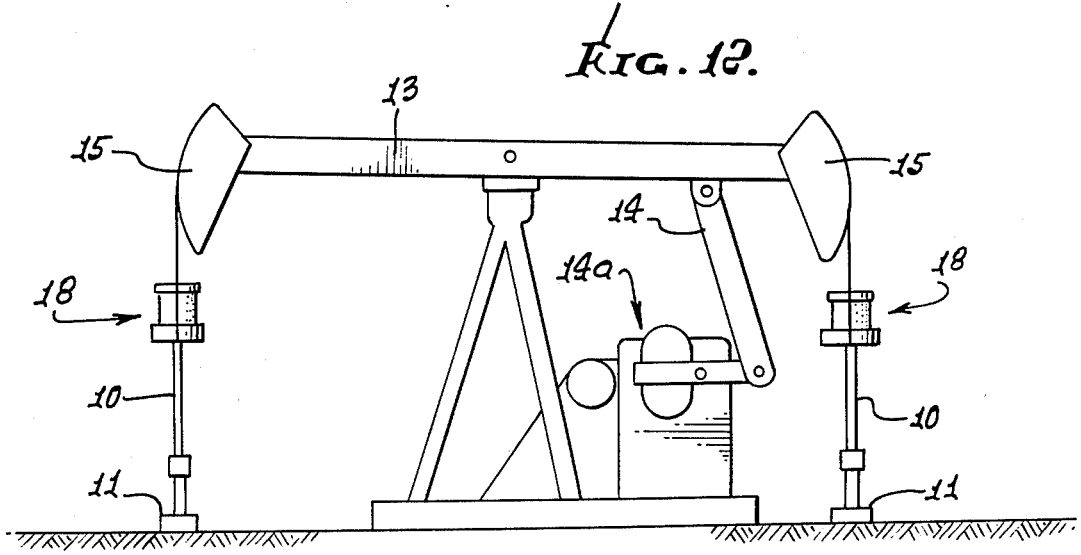

SHOCK ABSORPTION APPARATUS ASSOCIATED WITH WELL PUMP

BACKGROUND OF THE INVENTION

This application is a continuation-in-part of my prior application of Ser. No. 186,499, filed Sept. 12, 1980.

This invention relates generally to the pumping of wells, and more particularly concerns the cushioning of reciprocating load transmission during pumping.

Sucker rod strings are typically reciprocated up and down in oil wells during pumping. It is found that sharp load reversals during such pumping inhibit oil production. Attempts have been made to overcome this problem; however, no such attempts have to my knowledge embodied the unusually advantageous apparatus, mode of operation and results achieved by the present invention.

SUMMARY OF THE INVENTION

It is a major object of the invention to provide load reversal cushioning apparatus of improved design and mode of operation and which will in operation improve or aid the production and flow of well fluid such as oil.

Fundamentally the invention is embodied in:
(a) upper and lower generally horizontal members to pass a pumping rod,
(b) shock absorbing cushion means confined between the members, the cushion means defining an opening to pass the rod, the cushion means comprising cushions located at transversely opposite sides of that opening,
(c) the upper member adapted to receive loading exerted downwardly by the rod,
(d) the lower member adapted to be supported and stroked up and down by a pump unit.

As will appear, the cushions may define hollows containing compressible fluid and which are vertically compressible against resistance imposed by the fluid, which may consist of gas; and the hollow cushions may be elastomeric (as for example in bellows configuration) and located at opposite sides of an axis defined by the sucker rod. Alternatively, the cushions may comprise multiple cylinders and pistons that work in such cylinders, and accumulator means may be provided and connected via ducting to such cylinders or to the cushion hollows, to adjust or control the compression of the cushion means.

Further, guide means are typically associated with one or the other of the members, or both, to stablize at least one of such members, vertically, during stroking. As will be seen, the guide means may include guide rod means carried by one of the members, and sleeve means carried by the other of the members, to vertically guide the guide rods.

In addition, other cushion means may be provided between a pumping unit working beam and a rotary drive therefor, as will be seen.

The invention facilitates such improved cushioned stroking of the sucker rod as will cause significantly increased production of petroleum from a sub-surface pump or pumps operated by the sucker rod.

These and other objects and advantages of the invention, as well as the details of an illustrative embodiment, will be more fully understood from the following description and drawings, in which:

DRAWING DESCRIPTION

FIG. 1 is an elevation showing a pumping unit, and incorporating the invention;

FIG. 2 is an enlarged elevation showing the shock absorbing apparatus incorporated in FIG. 1;

FIG. 3 is an elevation taken on lines 3—3 of FIG. 2;

FIG. 4 is a view like FIG. 2, but showing a modification;

FIG. 5 is a horizontal section taken on lines 5—5 of FIG. 4;

FIGS. 6 and 7 are elevations showing other pumping units incorporating the invention;

FIG. 8 is an elevation showing a pumping unit like that of FIG. 6, but comprising a further modification;

FIG. 9 is an enlarged section taken in elevation through an additional shock absorber used in FIG. 8;

FIG. 10 is an elevation showing a pumping unit like that of FIG. 10, but comprising yet another modification;

FIG. 11 is an enlarged section taken in elevation through an additional shock absorber used in FIG. 11.

FIG. 12 shows a further modification;

FIG. 13 is a view like FIG. 3 showing a further modification;

DETAILED DESCRIPTION

Figure 14:
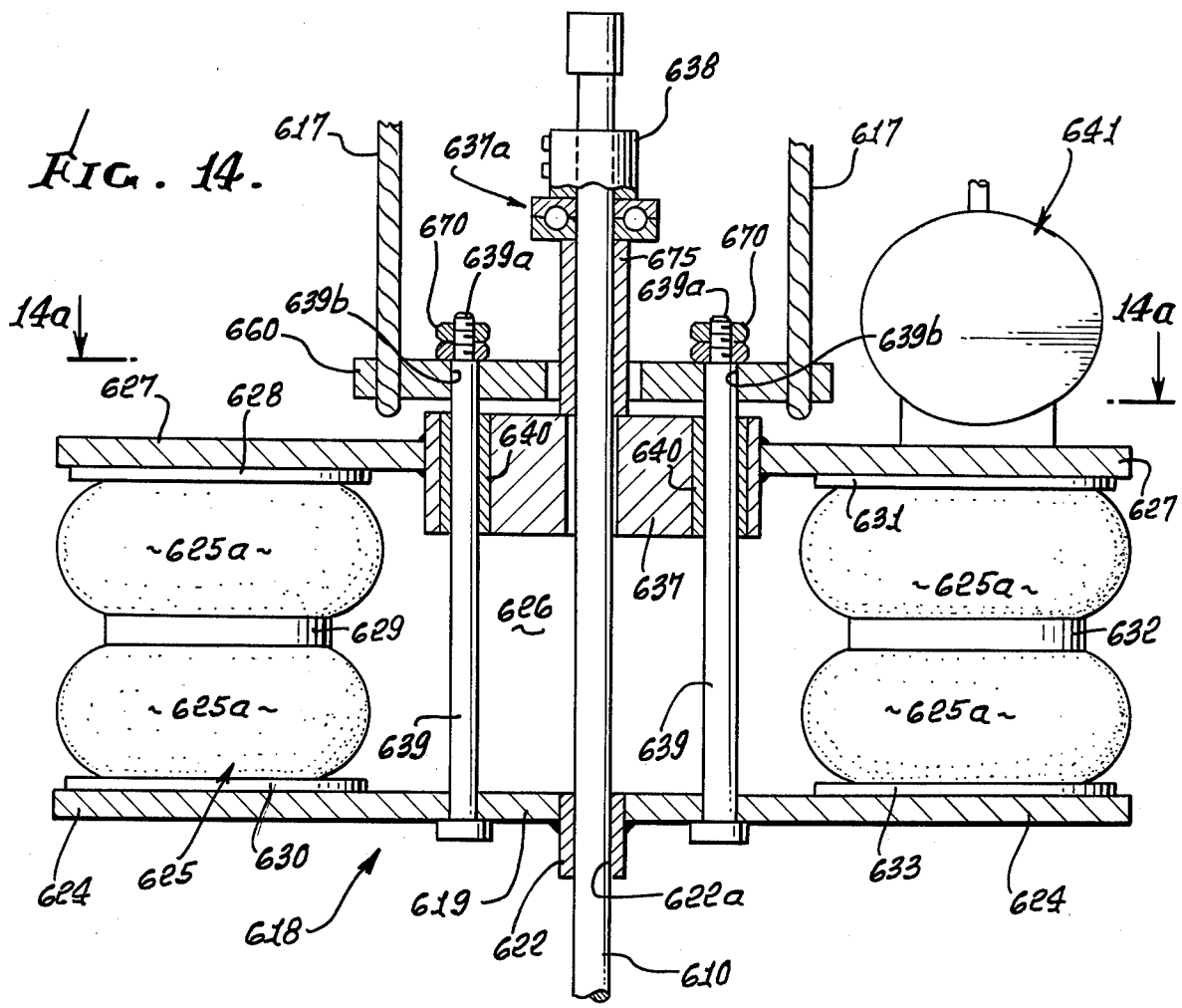
FIG. 14 is another view like FIG. 2 showing a modification.

In FIGS. 1 and 2, a well sucker rod 10 is vertically reciprocable in well 11 for pumping fluid such as oil to the surface and to a lateral flow line 12. A pumping unit to reciprocate the rod 10 vertically may comprise a rocker arm 13 connected by link 14 to a rotary drive 14a. A horsehead 15 on arm 13 (which is pivoted at 16) suspends cables 17 that wrap and unwrap on the horsehead as the latter moves up and down. Shock absorber or cushioning unit 18 is connected between the cables 17 and rod 10 to cushion the lifting and lowering forces transmitted between the rod 10 and cables 17, and thereby reduce wear, and aid in oil production.

As better shown in FIGS. 2 and 3, the unit 18 includes a base 19 which extends laterally to be connected to the pumping unit via the cables. The latter may loop around notches 20 in the base, at opposite sides of vertical center line 21. The sucker rod 10 extends upwardly through a bore 22a through bronze wear cushion or sleeve 22 in the base. Cables or "reins" 17 support or carry the base. A lower plate member 24, supported by the base, carries shock absorbing cushion means 25 which may take the form of hollow cushions 25a. There are pairs of cushions at opposite sides of a central opening or space 26 which passes the sucker rod 10, the cushions of each pair vertically spaced or stacked, as shown.

The cushions are confined between lower transverse plate member 24 and upper transverse plate member 27, with suitable mounting plates or retainers 28–33 located at the upper and lower sides of each cushion, as shown, whereby the transversely annular cushions of each pair are vertically aligned. The cushions of each pair may comprise a single convolute, bellows type cushion as for example is produced by Goodyear Corporation, Model 2B6. See the interconnection between the air filled cushion hollows 34 and 35, at 36 in FIG. 2, and defining an "air spring". Single or multiple elastomeric cushions may be employed, and they are vertically compressible against resistance imposed by the air, or other fluid contained therein.

Upper plate 27 is connected via insert 37 to clamp 38, which is in turn clamped to the sucker rod 10. Guide rods 39 connected to insert 37 extend vertically downwardly through sleeves or bushings 40 carried by base 19, to guide the relative up and down movement of the plate members 24 and 27 and the cushions. Accordingly, guide means is provided to stabilize the members 24 and 27, the base 19 and the cushions, during stroking or pumping of the well. Rotary thrust bearing 37a supports the clamp 38 and rod string.

Finally, an air tank or accumulator 41 is connected at 42 and 43 with the cushions, to provide pressurization therefor, and intercommunication of the cushions, for stabilizing and improved cushioning functioning. Such cushioning is adjustable by virtue of adjustable pressurization of the air tank, via inlet 44. The tank is shown as carried by upper plate 27.

Turning to FIG. 4, the modified device 118 includes a transverse base 119 having notches 120 to which "reins" or cables 17 are connected, as before. The shock absorbing cushion means comprises multiple cylinders and pistons that work in such cylinders. The cylinders are defined by vertical bores 121 in block member 122 having a lower horizontal member 122a attached to base 119. The vertically extending pistons in bores 121 are indicated at 123, and are integral with upper horizontal member 124. That member is clamped at 125 to well sucker rod 10. Shoulders 126 on skirt 127 integral with member 124 are engageable with shoulders 128 on block 122 to limit relative upstroking of skirt 127 relative to block 122, these being telescopically interfitting elements. As the base 119 is elevated, air in the cylinder zones 130 is compressed by the pistons. Zones 130 intercommunicate as via lines 131-133 connected to accumulator 134 which is carried by base 119.

In FIG. 6, the elements of the pumping unit which are the same as in FIG. 1 are given the same numbers as used in FIG. 1. A shock absorber means is indicated at 218, and make for example take the form of the absorber 18 described above. Other types may also be used. Further, additional cushion means is operatively connected between the rotary drive 14a and the working beam 13. One such additional cushion means is shown at 218a, to bear compressive load exerted downwardly by the link 14 on the beam 13. Link 14 passes up through the rod, and is connected to pivot joint 219 on a second beam 220. Downward load on joint 219 is exerted on cushion means 218a carried by beam 13. Beam 220 at one end carries and laterally locates joint 219, and at its opposite end is pivotally connected at 221 to beam 13, to allow up and down pivoting of beam 220. Cushion means 218a may take the same form as shock absorber 18.

In FIG. 7, corresponding elements bear the same numbers as in FIG. 6. Here, the auxiliary beam 220a, is below beam 13; and cushion 218b and joint 219a are also below beam 13. Cushion 218b, which is compressed by the load, is at the horsehead side of pivot 16, in FIG. 7, whereas in FIG. 6 the cushion 218a is at the opposite side of pivot 16 from the horsehead.

In FIG. 9 the additional cushion means 318 (which may be substituted for cushions 218a and 218b) includes an elastomeric cushion 331; a frame 332 operatively connected at one end 332a to one end of the cushion 331, and a pusher 333 bearing against the opposite end of the cushion 332. A bronze bushing 334 passes pusher stem 333a. The frame 332 and pusher 333 may be operatively and respectively connected to the rotary drive and walking beam, shown at 14a and 13 in FIG. 8, which is like FIG. 6, with cushion means 318 in tension and in series with link 14. In FIG. 11, another form of absorber or cushion means 418 is shown. It includes cushion 431; a frame 432 connected at one end 432a to cushion 421, and a pusher 433 bearing against the opposite end of the cushion 432. Bushing 434 passes pusher stem 433a. Cushion 418 is shown in FIG. 10 as connected in compression in series with link 14. FIG. 10 is otherwise like FIG. 7.

In FIG. 12, the pumping unit includes the same elements as in FIG. 1, the elements having the same numbers. In addition, elements 18, 15, 10 and 11 are repeated at the opposite end of the beam 13, so that two wells are pumped by the same drive unit, and via shock absorbers 18, as shown.

The rod weight in one well is approximately balanced by the rods in the other well. On off-shore platforms, this double pumper saves valuable space. Balancing weights on the drive would only be needed if one well was deeper than the other well. Another advantage is that only one motor and one gear box would be wearing. There would be a savings in energy consumption because this unit would only be lifting fluid, no weights (if the well depth and pump size were the same) and no rods.

In a conventional pumping unit the weight of the rods and the weight of the fluid must be lifted, and if there were no counter balance weight, the unit could not pump unless it were extremely over powered. If the weight of the rods were 8000 lbs and the weight of the fluid were 6000 lbs for a total of 14,000 lbs, about 7000 lbs of counter balance weights are used, so that the motor is pulling an even 7000 lbs on both the down stroke (when it is lifting the weights) and 7000 lbs when it is lifting the rods and fluid but with 7000 lbs of weights to assist.

With applicant's unit, only the weight of the fluid would be lifted which would amount to 55% to 60% or 65% saving in electricity; also the shock absorber means 18 act to improve pumping efficiency as described above.

In FIG. 13, a resilient, elastomeric cushion 500 is located between vertically spaced horizontal members 501 and 502. Member 501 is adapted to receive loading exerted downwardly by sucker rod 10, via clamp 503. Rod 10 passes freely through a vertical opening 504 in cushion 500 and slider in a bushing 505. Base 502a, integral with member 502, has upper extensions 506 operatively connected to cable "reins" 17 that engage horsehead 15, in FIG. 1. That operative connection includes a transverse load extender bar 507 attached via links 508 to extension 506, and attached via couplers 509 to the reins. This form of the invention is adapted for use where a rod load is so large that a shock absorber unit of extra large size is confined and received in the cup-shaped recess 510 formed by annular skirt 511 of the base.

Figure 14A:
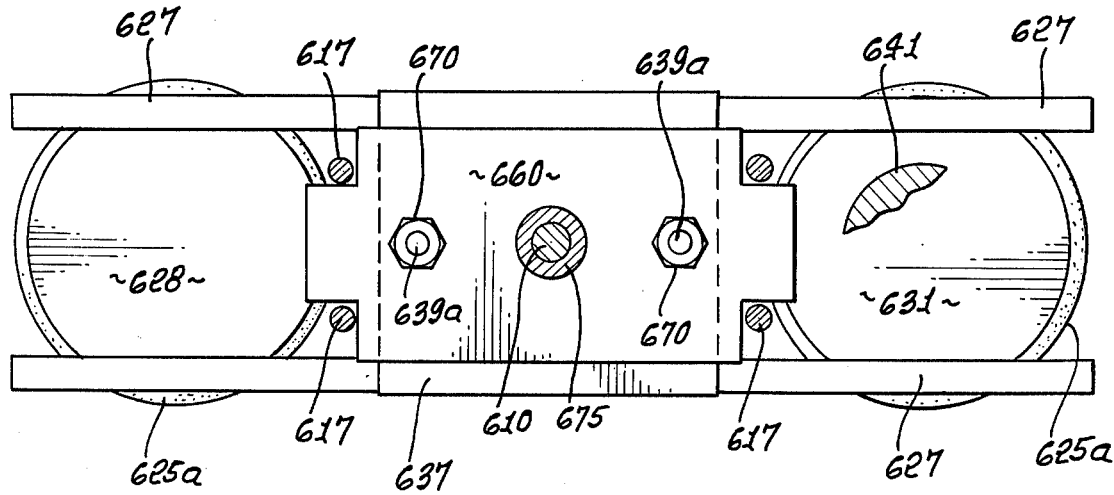
FIG. 14a is on lines 14a—14a of FIG. 14.

In FIGS. 14, and 14a, the unit 618 includes a base 619 which extends laterally to be connected to the pumping unit via cables or reins 617 suspending a transverse lift bar 660. The lift bar in turn suspends the base 619 via guide rods 639, as shown. The sucker rod 610 extends upwardly through a bore 622a in bronze wear bushing or sleeve 622 in the base.

Transverse lower members 624, supported by or integral with the base 619, carry shock absorbing cushion means 625 which may take the form of hollow cushions 625a like cushions 25a in FIG. 2. There are pairs of such cushions at opposite sides of a centered opening or space 626 which passes the rod 610, the cushions of each pair being vertically spaced or stacked, as shown.

The cushions are confined between lower transverse members 624, and upper transverse members 627, with suitable mounting plates or retainers 628-633 located at the upper and lower sides of each cushion, as shown, whereby the cushions of each vertical pair be vertically aligned or stacked.

Upper member 627 is connected to clamp 638, via integral (insert) block 637, spacer sleeve 675 and rotary thrust bearing 637a. The clamp is connected to rod 610 and rests on bearing 637a. Guide rods 639 project upwardly through guide sleeves or bushings 640 carried by insert block 637, to guide the relative up and down movement of the transverse members 624 and 627, and the cushions confined therebetween. Accordingly, guide means is provided to stabilize the members 624 and 627, base 619, block 637 and the cushions, during stroking or pumping of a well. Adjusting nuts 670 are threadably attached to the upper threaded ends 639a of the rods 639 to enable adjustment of the connection to the reins 617 to the base 619, to facilitate smooth up and down sliding of the guide rods in the sleeves 640. Holes 639a in plate 660 pass the rods 639.

An air tank or acummulator 641 is connected to the cushions in the same manner that tank 41 is connected to cushions 25a in FIG. 2.

Note that rods 639 in the space between the cushions defined an upright plane which intersects all the cushions. The same is true of the guide rods in FIG. 2. Accordingly, access of the cushions is unobstructed, as is clear from the drawings.

I claim:

1. A well sucker rod shock absorber apparatus, the combination comprising
   (a) upper and lower generally horizontal members to pass the rod at a vertically axial location,
   (b) shock absorbing cushion means confined between the members, the cushion means defining an opening to pass the rod, the cushion means comprising flexible cushions located at transverse sides of said opening,
   (c) the upper member adapted to receive loading exerted downwardly by the rod,,
   (d) the lower member adapted to be supported and stroked up and down by a pump unit,
   (e) said cushions defining hollows containing gas, and which are vertically compressible against resistance imposed by said gas, each cushion having an annular outer wall which bulges outwardly, said bulging outer wall height occupying a substantial portion of the spacing defined between said upper and lower members,
   (f) guide rod means carried by one of said members and sleeve means carried by the other of said members to receive and guide said guide rod means, the guide rod means including two transversely spaced guide rods and the guide sleeve means including two transversely spaced guide sleeves, the rods confined in said opening between said cushions and at opposite sides of said vertically axially spaced location,
   (g) each said cushion comprising bellows having multiple, upper and lower annular convolutions,
   (h) and means interconnecting the cushions at opposite sides of said opening to intercommunicate the gas in said cushions at opposite sides of the opening,
   (i) said guide rods defining a plane intersecting all of the cushions,
   (j) whereby the cushions remain openly and peripherally unobstructed to access for adjustment or replacement.

2. The combination of claim 1 wherein the walls of said cushions consist of elastomeric material.

3. The combination of claim 1 wherein the lower member has ears connectible to rein elements of the pump unit.

4. The combination of claim 3 including said rein elements connected to said lower member.

5. The combination of claim 1 including a clamp connected to said upper member, the upper member and clamp being annular to pass the sucker rod, and a thrust bearing supporting the clamp.

6. The combination of claim 1 including accumulator means having fluid connection with said cushions.

7. The combination of claim 1 including said pumping unit to which said shock absorbing cushion means is operatively connected.

8. The combination of claim 7 wherein the pumping unit includes a walking beam and a horsehead, the cushion means connected to the horsehead via cable means.

9. The combination of claim 8 wherein the pumping unit includes a rotary drive, and additional gas filled cushion means operatively connected between said rotary drive and said walking beam.

10. The combination of claim 9 including a second beam having one end attached to the walking beam, the additional cushion means operatively connected between the opposite end of the second beam and the walking beam.

11. The combination of claim 9 wherein said additional cushion means includes an elastomeric cushion, a frame operatively connected to one end of the elastomeric cushion, a pusher bearing against the opposite end of the elastomeric cushion, the frame and pusher operatively connected to the rotary drive and the walking beam.

12. The combination of claim 1 including an accumulator connected with said cushion hollows via ducting.

13. The combination of claim 1 that further includes
   (k) a walking beam well pumping unit, including a drive for the beam, and a beam pivot,
   (l) sucker rod strings extending into two wells, said walking beam operatively connected to both rod strings, which are respectively located at opposite sides of said pivot,
   (m) one of said rod strings including the said rod extending in said vertical axial location and exerting loading on said upper member.

14. The combination of claim 1 wherein the guide rods are carried by the upper member and project downwardly through the sleeves which are carried by the lower member.

15. The combination of claim 1 wherein the guide rods are carried by the lower member and project upwardly through the sleeves which are carried by the upper member.

16. The combination of claim 15 including a transverse lift bar having adjustable connection to upper end portions of the guide rods, the lift bar having means connectible to rein elements of the pump unit.

17. The combination of claim 1 that further includes:
(k) a walking beam pumping unit, including a drive for the beam, the beam connected to vertically reciprocate a rod string in a well, said string including said rod which exerts loading on said upper member, the drive including a rotary unit, and
(l) shock absorbing means operatively connected between said rotary unit and said walking beam.

18. The combination of claim 17 wherein said drive includes a linkage between said rotary unit and said beam, the shock absorbing means connected in series with said linkage.

19. The combination of claim 17 wherein said shock absorbing means is connected to be in compression between said drive and said beam.

20. The combination of claim 17 wherein said shock absorbing means is connected to be in tension between said drive and said beam.

* * * * *